United States Patent
Osada et al.

(10) Patent No.: US 12,066,067 B2
(45) Date of Patent: Aug. 20, 2024

(54) PAD SPRING AND DISC BRAKE

(71) Applicant: Hitachi Astemo, Ltd., Ibaraki (JP)

(72) Inventors: Takahito Osada, Hitachinaka (JP);
Shigeru Hayashi, Hitachinaka (JP);
Yorihito Miura, Hitachinaka (JP);
Yusuke Shigeta, Hitachinaka (JP);
Masahiko Kamesawa, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 457 days.

(21) Appl. No.: 17/414,394

(22) PCT Filed: Dec. 2, 2019

(86) PCT No.: PCT/JP2019/046958
§ 371 (c)(1),
(2) Date: Jun. 16, 2021

(87) PCT Pub. No.: WO2020/129582
PCT Pub. Date: Jun. 25, 2020

(65) Prior Publication Data
US 2022/0049748 A1 Feb. 17, 2022

(30) Foreign Application Priority Data
Dec. 18, 2018 (JP) .................. 2018-236336

(51) Int. Cl.
*F16D 65/097* (2006.01)
*F16D 55/227* (2006.01)
*F16D 55/00* (2006.01)

(52) U.S. Cl.
CPC ....... *F16D 55/227* (2013.01); *F16D 65/0977* (2013.01); *F16D 2055/0041* (2013.01); *F16D 2250/0046* (2013.01)

(58) Field of Classification Search
CPC .. F16D 55/227; F16D 65/097; F16D 65/0973; F16D 65/0974; F16D 65/0977; F16D 2055/0041; F16D 2250/0046
See application file for complete search history.

(56) References Cited

U.S. PATENT DOCUMENTS

| | | | |
|---|---|---|---|
| 6,223,866 B1 * | 5/2001 | Giacomazza | F16D 65/0972 188/73.38 |
| 8,397,880 B2 * | 3/2013 | Chelaidite | F16D 65/0978 188/73.31 |

(Continued)

FOREIGN PATENT DOCUMENTS

| | | |
|---|---|---|
| DE | 10 2013 012 238 | 1/2014 |
| JP | 63-166729 | 10/1988 |

(Continued)

OTHER PUBLICATIONS

International Search Report issued Feb. 10, 2020 in International Application No. PCT/JP2019/046958, with English translation.

(Continued)

*Primary Examiner* — Thomas W Irvin
(74) *Attorney, Agent, or Firm* — Wenderoth, Lind & Ponack, L.L.P.

(57) ABSTRACT

Protruding portions protruding in a direction of approaching a disc rotor are integrally formed in a locking plate portion of a pad spring. Moreover, an insulating resin coating is formed on a front surface side (surface in a region opposed to an outer peripheral surface of the disc rotor) of the locking plate portion. The coating film formed on the front surface of the locking plate portion flows downward by its own weight before the coating material is solidified. As a result, the coating film formed on bottom surfaces (front surfaces of protrusions) of the protruding portions is thinner in film thickness than that of the coating film in other region.

8 Claims, 9 Drawing Sheets

(56) References Cited

U.S. PATENT DOCUMENTS

| | | | |
|---|---|---|---|
| 8,806,755 B2* | 8/2014 | Kim | F16D 65/0971 |
| | | | 29/896.91 |
| 9,267,559 B2* | 2/2016 | Boyle | F16D 65/0978 |
| 9,400,023 B2* | 7/2016 | Mahoudeaux | F16D 65/0978 |
| 9,664,244 B2 | 5/2017 | Osada | |
| 9,677,629 B2* | 6/2017 | Boyle | F16D 65/0978 |
| 10,619,688 B2* | 4/2020 | Song | F16D 65/183 |
| 2008/0190715 A1* | 8/2008 | Kang | F16D 65/0972 |
| | | | 188/73.1 |
| 2009/0277729 A1* | 11/2009 | Kim | F16D 65/0972 |
| | | | 188/73.38 |
| 2011/0168503 A1* | 7/2011 | Chelaidite | F16D 65/0978 |
| | | | 188/73.31 |
| 2013/0001024 A1 | 1/2013 | Odaira et al. | |
| 2014/0026420 A1* | 1/2014 | Kim | F16D 65/0006 |
| | | | 29/896.9 |
| 2014/0374202 A1* | 12/2014 | Mahoudeaux | F16D 55/2262 |
| | | | 188/250 E |
| 2018/0274611 A1* | 9/2018 | Song | F16D 65/0972 |
| 2018/0345919 A1 | 12/2018 | Nishino et al. | |
| 2019/0003538 A1* | 1/2019 | Gerber | F16D 55/2262 |
| 2021/0309928 A1* | 10/2021 | Afaneh | F16D 65/0977 |
| 2023/0048529 A1* | 2/2023 | Gerber | F16D 65/0972 |

FOREIGN PATENT DOCUMENTS

| | | |
|---|---|---|
| JP | 3-11138 | 2/1991 |
| JP | 2008-032125 | 2/2008 |
| JP | 2013-015162 | 1/2013 |
| JP | 2017-150589 | 8/2017 |
| WO | 2017/090643 | 6/2017 |

OTHER PUBLICATIONS

Written Opinion of the International Searching Authority issued Feb. 10, 2020 in International Application No. PCT/JP2019/046958, with English translation.

Office Action issued on Mar. 8, 2022, in corresponding India Application No. 202117026634, with English translation.

Office Action issued Mar. 27, 2024 in DE Patent Application No. 112019006285.9, with English translation.

* cited by examiner

PAD SPRING AND DISC BRAKE

TECHNICAL FIELD

The present invention relates to a pad spring for a disc brake configured to apply a braking force for a vehicle such as a four-wheeled motor vehicle, and a disc brake.

BACKGROUND ART

In general, a disc brake provided for a vehicle such as a motor vehicle includes, for example, a mounting member, a caliper, pad springs. The mounting member is mounted to a non-rotational portion of the vehicle, and includes a pair of arm portions that straddle, in an axial direction, an outer peripheral side of a disc rotor. The caliper is slidably provided for each of the arm portions of the mounting member, and is configured to press a pair of friction pads against both of surfaces of the disc rotor. The pad springs are mounted on the sides of the arm portions of the mounting member, respectively, and are configured to elastically support the pair of friction pads between the arm portions (for example, see Patent Literature 1).

The pad springs are configured to elastically support the friction pads on an inner side and an outer side, and to achieve smooth displacements of the friction pads in a disc axial direction. For that purpose, in some cases, a resin coating is applied to the pad springs at portions in contact with the friction pads so as to increase slidability of the friction pads. Moreover, locking portions are provided for the pad springs. The locking portions are locked to disc path portions of the arm portions from a radially inner side, respectively, so as to be mounted to the mounting member. As a result, the pad springs are positioned with respect to the arm portions of the mounting member in the disc axial direction. The resin coating may be formed also on the locking portions.

CITATION LIST

Patent Literature

[PTL 1] JP 2017-150589 A

SUMMARY OF INVENTION

Technical Problem

Incidentally, in Patent Literature 1, in order to avoid a defect caused by interference with components on the vehicle side when the caliper is assembled to the vehicle, a clearance inspection is conducted at the time of shipment of the caliper so as to check whether or not the caliper is accommodated in a specified space. As the clearance inspection, there is a method of mounting the caliper to a jig that is in the shape of components around the caliper such as the disc rotor and, in this state, electrically checking contact between the caliper and the jig based on the presence or absence of an occurrence of short circuit between the caliper and the jig.

In the case of conducting such clearance inspection, a jig portion corresponding to the disc rotor in the jig that is in the shape of the components around the caliper and the locking portions of the pad springs are brought close to each other so that the presence or absence of contact therebetween is to be electrically detected. However, the resin coating is applied to the locking portions of the pad springs, and hence, even when the contact occurs between the locking portion and the jig portion corresponding to the disc rotor due to, for example, a defect, an electrical short circuit may not occur due to an insulation property provided by the resin coating. That is, the insulating resin coating is interposed between the locking portions and the jig portion corresponding to the disc rotor, and hence, even when a desired clearance is not secured therebetween, the caliper may pass the clearance inspection, and an erroneous determination is thus liable to be made.

Solution to Problem

An object of the present invention is to provide a pad spring and a disc brake which enable an accurate clearance inspection at the time of shipment, thereby being capable of improving workability at the time of the inspection.

According to one embodiment of the present invention, there is provided a pad spring to be installed in a disc brake, the pad spring including a locking portion to be locked to a mounting member to be mounted to a non-rotational portion of a vehicle, wherein the locking portion includes a coating film having a thinner coating film thickness in at least a part of a region opposed to a disc rotor than a coating film thickness in other region.

Further, according to one embodiment of the present invention, there is provided a pad spring to be installed in a disc brake, the pad spring including a locking portion to be locked to a mounting member to be mounted to a non-rotational portion of a vehicle, wherein the locking portion includes a protruding portion protruding in a direction of approaching a disc rotor.

Meanwhile, according to one embodiment of the present invention, there is provided a disc brake, including: a mounting member, which is to be mounted to a non-rotational portion of a vehicle, and is formed so as to straddle an outer peripheral side of a disc rotor; a pair of friction pads configured to be pressed against both of surfaces of the disc rotor; and a pad spring, which is mounted to the mounting member, and is configured to elastically support a corresponding one of the friction pads, wherein the pad spring includes a locking portion configured to lock the pad spring to a portion of the mounting member that straddles the outer peripheral side of the disc rotor, and wherein the locking portion includes a coating film having a thinner coating film thickness in at least a part of a region opposed to the disc rotor than a coating film thickness in other region.

Further, according to one embodiment of the present invention, there is provided a disc brake, including: a mounting member, which is to be mounted to a non-rotational portion of a vehicle, and is formed so as to straddle an outer peripheral side of a disc rotor; a pair of friction pads configured to be pressed against both of surfaces of the disc rotor; and a pad spring, which is mounted to the mounting member, and is configured to elastically support a corresponding one of the friction pads, wherein the pad spring includes a locking portion configured to lock the pad spring to a portion of the mounting member that straddles the outer peripheral side of the disc rotor, and wherein the locking portion includes a protruding portion protruding in a direction of approaching the disc rotor.

According to one embodiment of the present invention, the locking portion of the pad spring includes the coating film having a thinner coating film thickness in at least a part of the region opposed to the disc rotor than a coating film thickness in other region. Consequently, for example, an insulation resistance value of the resin coating decreases, and there can thus be secured a property of an electrical short circuit with respect to a jig portion corresponding to the disc rotor during a clearance inspection, thereby being capable of increasing the accuracy of the clearance inspection.

Moreover, the protruding portions that protrude in the direction of approaching the disc rotor are formed in the locking portion of the pad spring so that the protruding portions can be portions having the narrowest clearance on a disc radially outer side. Consequently, the inspection accuracy can be increased by conducting the clearance inspection through an electrical short circuit at the closest portions.

DESCRIPTION OF EMBODIMENTS

A detailed description is now given of a pad spring and a disc brake according to embodiments of the present invention with reference to FIG. 1 to FIG. 18 of the accompanying drawings.

Figure 1:
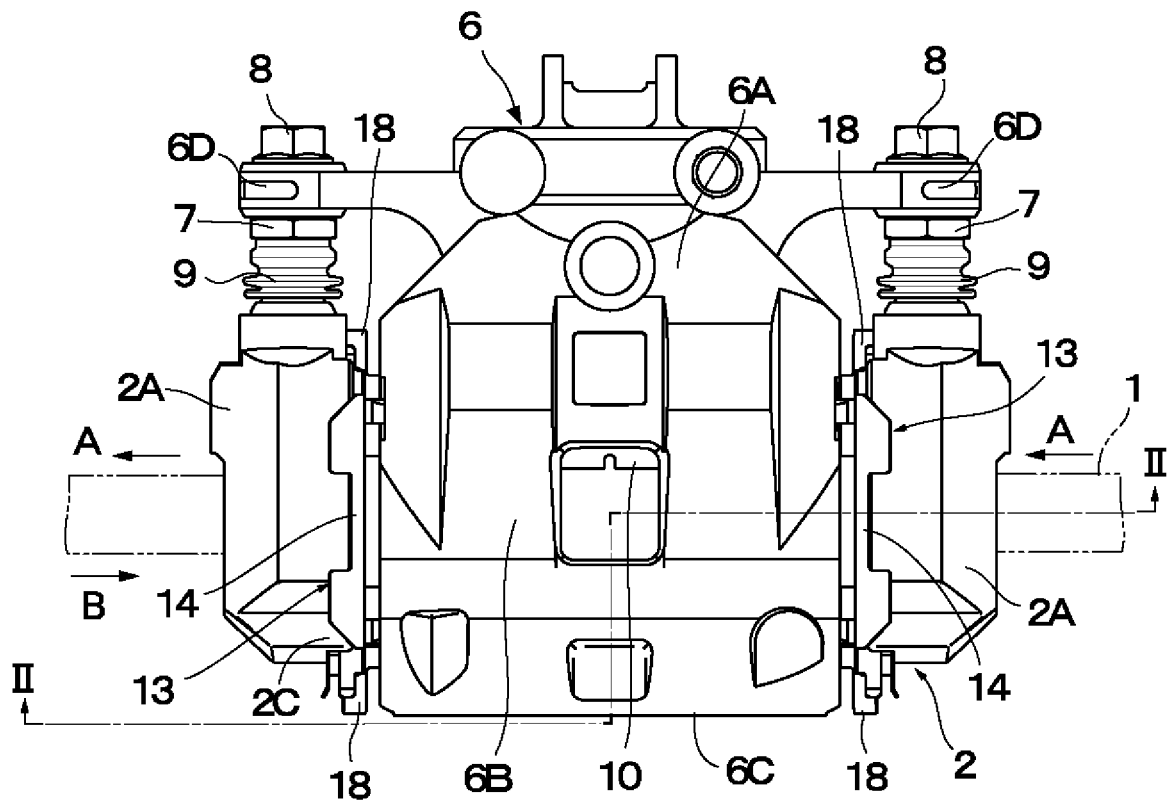
FIG. 1 is a plan view of a disc brake according to a first embodiment of the present invention as viewed from above.

FIG. 1 to FIG. 10 show a first embodiment of the present invention. In FIG. 1, for example, a disc rotor 1 rotates, together with a wheel (not shown), in an arrow A direction of FIG. 1 when a vehicle travels forward, and the disc rotor 1 rotates in an opposite direction (arrow B direction) with respect to the arrow A direction when the vehicle travels backward.

Figure 2:
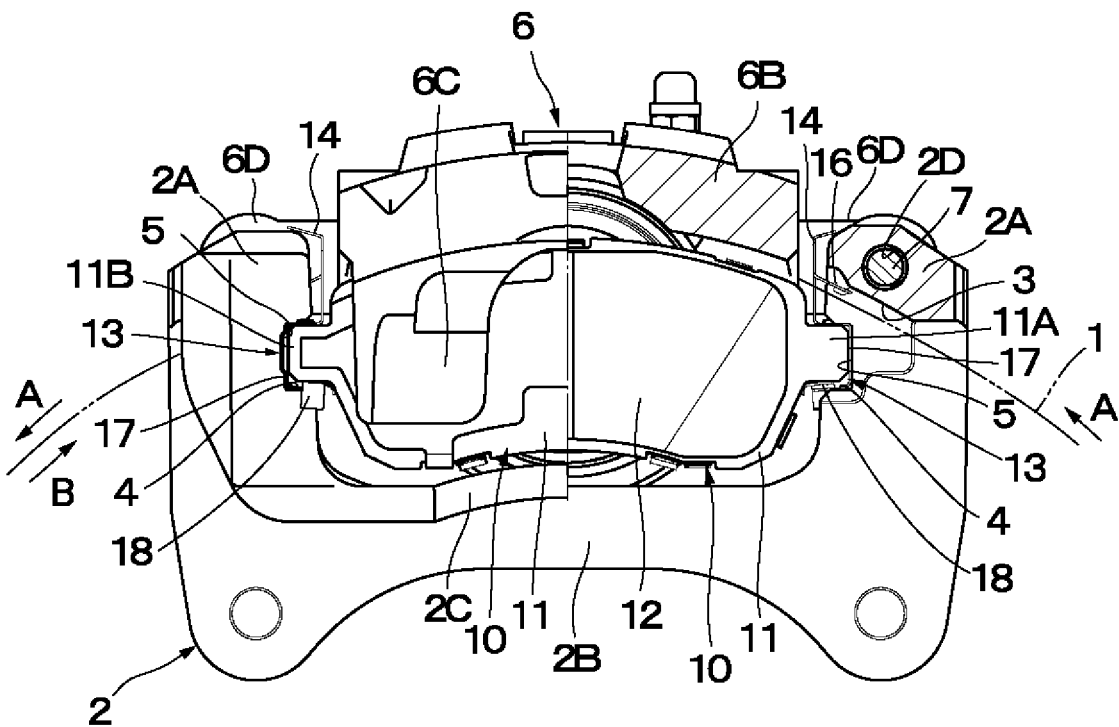
FIG. 2 is a partially broken front view of the disc brake as viewed from an arrow II-II direction of FIG. 1.

A mounting member 2 is a carrier to be mounted to a non-rotational portion (not shown) of the vehicle. As illustrated in FIG. 1 and FIG. 2, the mounting member 2 includes, for example, a pair of arm portions 2A, 2A and a support portion 2B. The arm portions 2A are apart from each other in a rotation direction of the disc rotor 1 (hereinafter referred to as "disc circumferential direction"), and extend in an axial direction of the disc rotor 1 (hereinafter referred to as "disc axial direction") so as to straddle an outer periphery of the disc rotor 1. The support portion 2B is thick, and is formed so as to integrally couple respective base end sides of the arm portions 2A to each other. The support portion 2B is fixed to the non-rotational portion of the vehicle at a position on an inner side of the disc rotor 1.

Moreover, as illustrated in FIG. 2, a reinforcing beam 2C in an arched shape is formed integrally with the mounting member 2. The reinforcing beam 2C couples respective distal end sides of the arm portions 2A to each other at a position on an outer side of the disc rotor 1. With such a configuration, the arm portions 2A of the mounting member 2 are integrally coupled to each other by the support portion 2B on the inner side of the disc rotor 1, and are integrally coupled to each other by the reinforcing beam 2C on the outer side.

Figure 3:
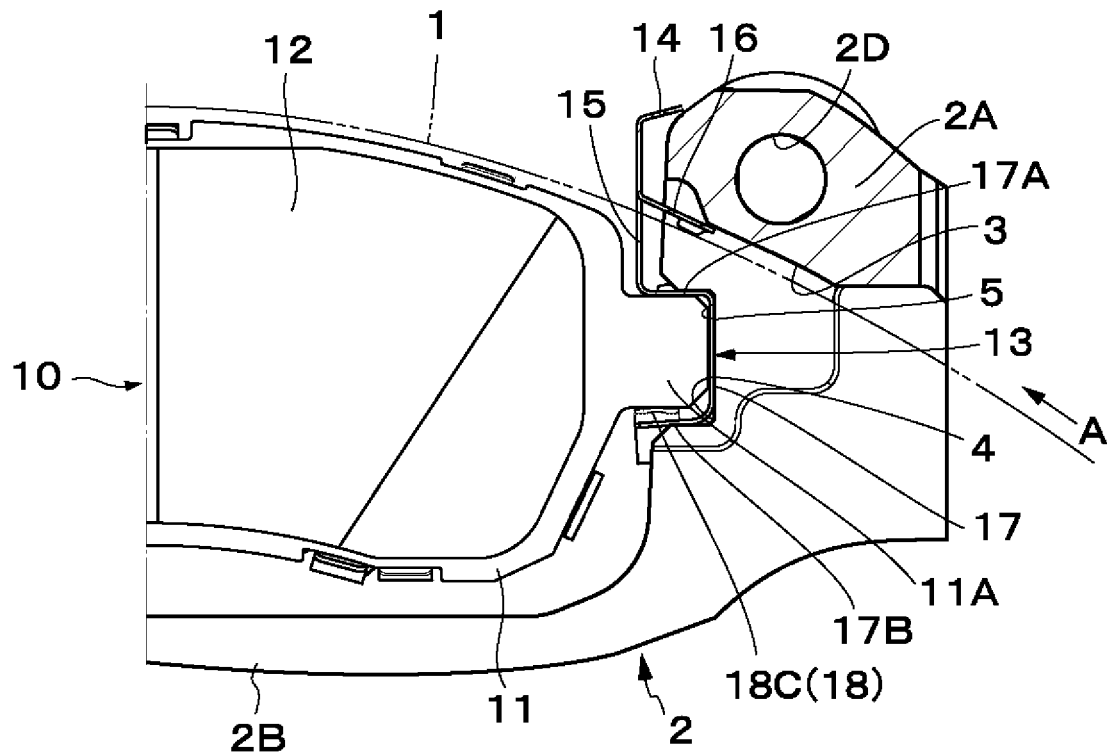
FIG. 3 is an enlarged partial cross-sectional view for illustrating a mounting member, a friction pad, and a pad spring in a state in which a caliper of FIG. 2 is removed.

As illustrated in FIG. 2 and FIG. 3, the arm portions 2A of the mounting member 2 each include a disc path portion 3 and pad guides 4 at a position corresponding to an intermediate portion in the axial direction of the disc rotor 1. The disc path portion 3 extends in an arc shape along the outer periphery (rotational locus) of the disc rotor 1. The pad guides 4 on the inner side and the outer side are positioned on both sides of the disc path portion 3 in the disc axial direction, and slidably support the friction pads 10 on the inner side and the outer side. Moreover, the arm portions 2A each have a pin hole 2D (only one is illustrated in FIG. 2 and FIG. 3). A sliding pin 7 described below is slidably inserted into the pin hole 2D.

As illustrated in FIG. 2 and FIG. 3, the pad guide 4 of each arm portion 2A is formed as a recessed groove having a square-cornered U shape cross section, and extends in a direction of a sliding displacement of the friction pads 10 described below, that is, the disc axial direction. The pad guide 4 is fitted, in a recess/projection engagement, to an ear portion 11A or 11B of the friction pad 10 described below such that the ear portion 11A or 11B is sandwiched from in an up-and-down direction (in a disc radial direction).

As a result, each of the pad guide 4 guides the friction pad 10 in the disc axial direction through intermediation of the ear portion 11A or 11B. An innermost wall surface of the pad guide 4 formed of the recessed groove forms a torque receiving surface 5 (see FIG. 2) that functions as a so-called torque receiving portion. The torque receiving surface 5 receives a braking torque, which is generated during a brake operation, from the friction pad 10 via the ear portion 11A or 11B.

That is, of the pad guides 4, 4 on the right and left sides illustrated in FIG. 2, the pad guide 4 on the left side which is located on an outlet side in the rotation direction (hereinafter referred to as "rotation outlet side") of the disc rotor 1 rotating in the arrow A direction, especially the torque receiving surface 5 on the bottom portion side receives the braking torque received by the friction pad 10 from the disc rotor 1 via the ear portion 11B of a backing plate 11 and a guide plate portion 17, described below, of the pad spring 13 during the brake operation.

The caliper 6 is slidably provided for the mounting member 2 through intermediation of, for example, the pair of sliding pins 7. As illustrated in FIG. 1, the caliper 6 is formed of an inner leg portion 6A, a bridge portion 6B, and an outer leg portion 6C. The inner leg portion 6A is formed on the inner side being one side of the disc rotor 1. The bridge portion 6B extends from the inner leg portion 6A toward the outer side being another side of the disc rotor 1 so as to straddle the outer peripheral side of the disc rotor 1 between the arm portions 2A of the mounting member 2. The outer leg portion 6C extends inward in the disc radial direction from the outer side being a distal end side of the bridge portion 6B, and is formed as a claw portion in a two-pronged shape on a distal end side.

The inner leg portion 6A of the caliper 6 has a cylinder into which a piston is slidably inserted (the piston and the cylinder are not shown). Moreover, a pair of mounting portions 6D each projecting in a right-and-left direction of FIG. 1 are formed in the inner leg portion 6A. Each mounting portion 6D slidably supports the entire caliper 6 on each arm portion 2A of the mounting member 2 through intermediation of the sliding pin 7.

As illustrated in FIG. 1, the sliding pin 7 is fastened to each mounting portion 6D of the caliper 6 through use of a bolt 8. A distal end side of each sliding pin 7 extends toward the pin hole 2D of each arm portion 2A of the mounting member 2. As exemplified in FIG. 2, the distal end side of each sliding pin 7 is slidingly inserted into each pin hole 2D of the mounting member 2. As illustrated in FIG. 1, a protection boot 9 is mounted between each arm portion 2A and each sliding pin 7. The protection boot 9 prevents rainwater and the like from entering between the sliding pin 7 and the pin hole 2D of the arm portion 2A.

The friction pad 10 on the inner side and the friction pad 10 on the outer side are arranged so as to be opposed to the both surfaces of the disc rotor 1. For example, as illustrated in FIG. 2 and FIG. 3, each friction pad 10 is formed of the backing plate 11, a lining 12, and the like. The backing plate 11 is in a flat plate shape that extends in a substantially fan shape in the circumferential direction (rotation direction) of the disc rotor 1. The lining 12 is a friction member that is fixed on a front surface side of the backing plate 11, and is in frictional contact with the surface of the disc rotor 1.

The backing plate 11 of the friction pad 10 has, in side surface portions thereof located on both sides of the disc rotor 1 in the circumferential direction, the ear portions 11A and 11B each having a protruding shape and functioning as fitting portions. The ear portions 11A and 11B of the backing plate 11 form torque transmission portions that are in abutment against the torque receiving surfaces 5 of the mounting member 2, to thereby transmit the braking torque received by the friction pads 10 from the disc rotor 1 during the brake operation of the vehicle.

As illustrated in FIG. 2, the ear portions 11A and 11B of the friction pad 10 (backing plate 11) are formed, for example, symmetrical in the right and left direction, and have the same shape. Moreover, one ear portion 11A is arranged on an inlet side in the rotation direction (rotation inlet side) of the disc rotor 1 rotating in the arrow A direction when the vehicle travels forward. The another ear portion 11B is arranged on the outlet side in the rotation direction (rotation outlet side) of the disc rotor 1.

Figure 4:
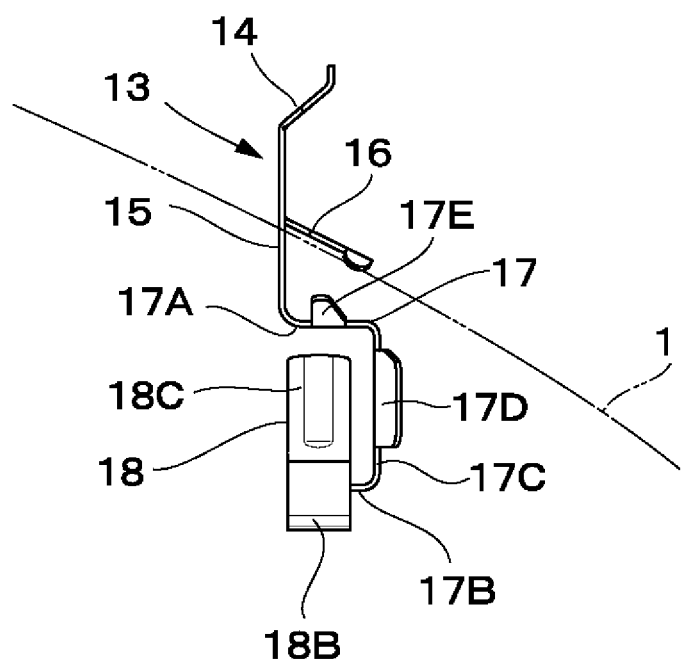
FIG. 4 is a front view for illustrating the pad spring of FIG. 3 as a single component.
Figure 5:
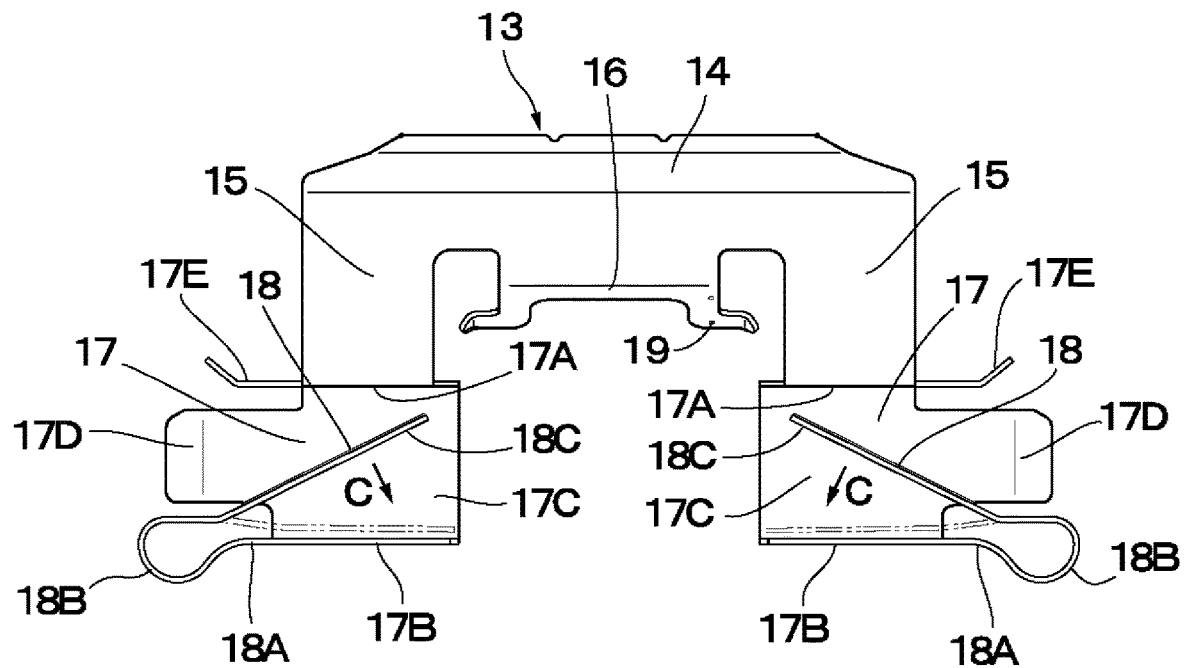
FIG. 5 is a left side view of the pad spring of FIG. 4 as viewed from the left side.
Figure 6:
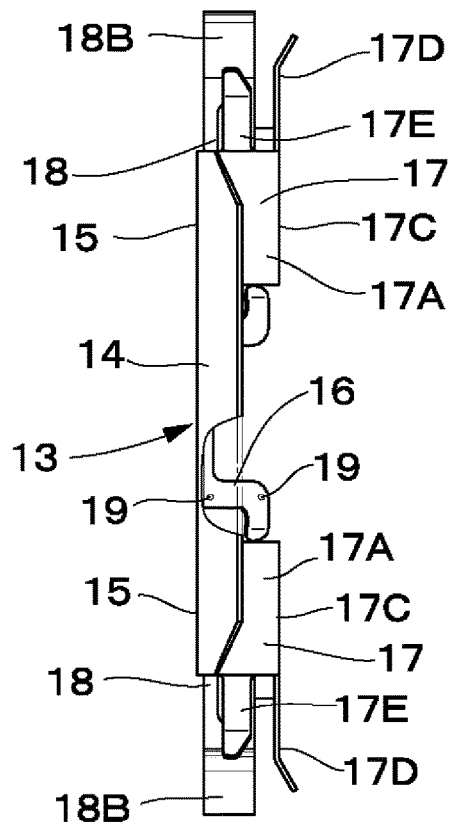
FIG. 6 is a partially broken plan view of the pad spring of FIG. 4 as viewed from the upper side.
Figure 7:
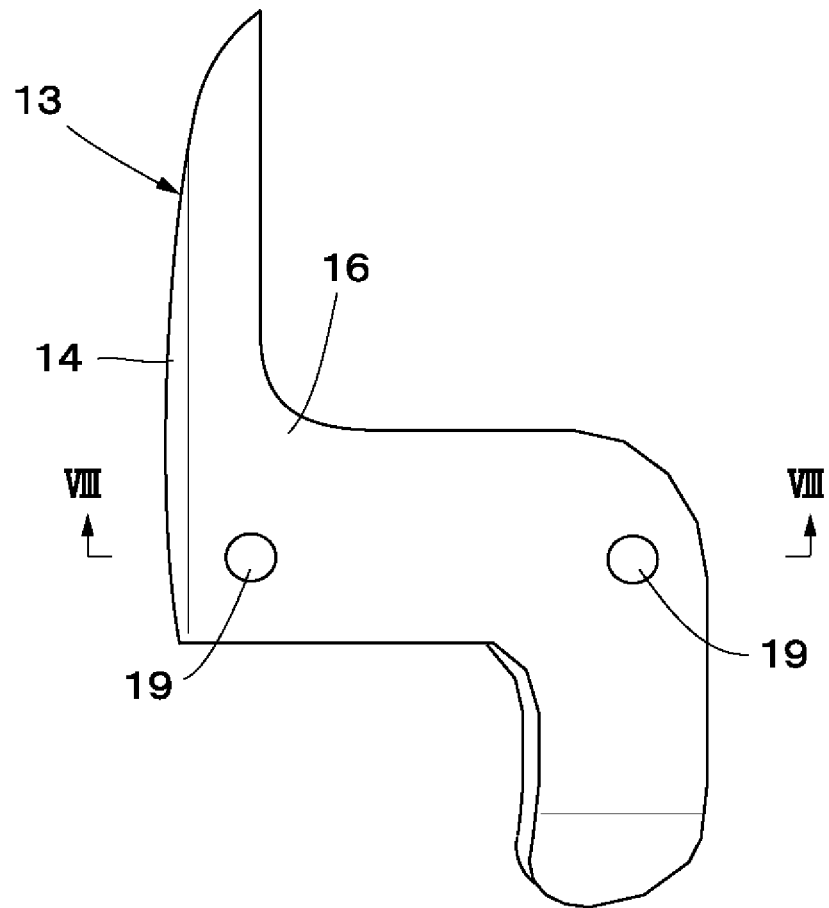
FIG. 7 is an enlarged view of a main part for illustrating a part of a locking plate portion of the pad spring of FIG. 6.

A pair of pad springs 13, 13 are provided for the arm portions 2A of the mounting member 2, respectively. Each pad spring 13 is configured to elastically support the friction pads 10 on the inner side and on the outer side, respectively, and to achieve smooth sliding displacements of the friction pads 10 in the disc axial direction. Moreover, as illustrated in FIG. 4 to FIG. 6, each pad spring 13 is formed by bending (press-forming) a stainless steel plate or the like having a spring property.

The pad spring 13 includes a coupling plate portion 14, flat plate portions 15, a locking plate portion 16, the guide plate portions 17, and radially biasing portions 18 described below. Regarding respective portions of the pad spring 13, hereinafter, terms "upper side," "upper surface," and "upward" are used to mean a radially outer side, a radially outer surface, and radially outward of the disc rotor 1, respectively. Terms "lower side," "lower surface," and "downward" mean a radially inner side, a radially inner surface, and radially inward of the disc rotor 1, respectively.

The coupling plate portion 14 of the pad spring 13 is formed so as to extend in the axial direction under the state in which the coupling plate portion 14 straddles the outer peripheral side of the disc rotor 1 in order to couple between the pair of flat plate portions 15 of the pad spring 13 together with the respective guide plate portions 17, that is, in order to integrally couple the respective guide plate portions 17 on the inner side and outer side of the disc rotor 1 to each other. The pair of flat plate portions 15 are integrally formed on both end sides of the coupling plate portion 14 in the lengthwise direction so as to extend radially inward of the disc rotor 1.

The locking plate portion 16 that functions as a locking portion is located between the pair of flat plate portions 15, and is formed integrally with the coupling plate portion 14. The locking plate portion 16 (that is, the locking portion) is mounted to each arm portion 2A of the mounting member 2 so as to be locked to the disc path portion 3 of the arm portion 2A from the radially inner side. As a result, the pad spring 13 is positioned with respect to the arm portions 2A of the mounting member 2 in the disc axial direction. The locking plate portion 16 is the locking portion in a plate shape configured to lock the pad spring 13 to the disc path portion 3 (that is, the portion that straddles the outer peripheral side of the disc rotor 1) of the arm portion 2A of the mounting member 2.

The pair of guide plate portions 17 are formed on the both of end sides of the coupling plate portion 14 through intermediation of the respective flat plate portions 15. Each guide plate portion 17 is formed by bending the guide plate portion 17 from a lower side end (distal end side) of the flat plate portion 15 into a substantially square-cornered U shape. One guide plate portion 17 of the pair of guide plate portions 17 is mounted through fitting in the pad guide 4 on the inner side. The another guide plate portion 17 is mounted through fitting in the pad guide 4 on the outer side.

Each guide plate portion 17 includes an upper surface plate 17A, a lower surface plate 17B, a guide bottom plate 17C, and an axially extending portion 17D. The upper surface plate 17A and the lower surface plate 17B are arranged to be opposed to an upper wall surface and a lower wall surface of the pad guide 4, respectively. The guide bottom plate 17C couples between the upper surface plate 17A and the lower surface plate 17B to each other in the radial direction of the disc rotor 1, extends in a flat surface shape in the disc axial direction, and is in abutment against the innermost wall surface (that is, torque receiving surface 5) of the pad guide 4. The axially extending portion 17D extends toward the outer side from the guide bottom plate 17C in the disc axial direction, and includes a distal end side obliquely inclined toward the outer side in the circumferential direction of the disc rotor 1.

Moreover, on the upper surface plate 17A of the guide plate portion 17, an insertion guide portion 17E is integrally formed. The insertion guide portion 17E protrudes toward the outer side in the disc axial direction. A distal end (protruding end) side of the insertion guide portion 17E is obliquely inclined toward the upper side of FIG. 5 (that is, radially outer side of the disc rotor 1). The insertion guide portion 17E is provided in order to smoothly guide, along with the axially extending portion 17D, the ear portion 11A or 11B to the inner side of the guide plate portion 17 when the ear portion 11A or 11B of the friction pad 10 is inserted between the upper surface plate 17A and the lower surface plate 17B of the guide plate portion 17.

The pair of radially biasing portions 18 that bias the ear portion 11A or 11B of respective friction pads 10 toward the radially outer side (that is, the upper side of FIG. 5) of the disc rotor 1 are formed through extension from the lower surface plates 17B of the respective guide plate portions 17. The radially biasing portion 18 includes a first extending portion 18A, a curled portion 18B, and a second extending portion 18C. The first extending portion 18A extends from the lower surface plate 17B of the guide plate portion 17 toward the outer side in the disc axial direction. The curled portion 18B is formed by folding backward a distal end side of the first extending portion 18A in a substantially C shape or a substantially U shape. The second extending portion 18C extends from the curled portion 18B in the direction of approaching the disc rotor 1, inclines obliquely upward (that is, the radially outward of the disc rotor 1), and is in abutment against the ear portion 11A or 11B of the friction pad 10.

When the ear portion 11A or 11B of the friction pad 10 is inserted between the upper surface plate 17A and the lower surface plate 17B of the guide plate portion 17, the radially biasing portion 18 elastically deflects and deforms in an arrow C direction, as indicated by two-dot chain lines of FIG. 5. That is, the radially biasing portion 18 elastically deforms such that the second extending portion 18C is sandwiched between the ear portion 11A or 11B of the friction pad 10 and the lower surface plate 17B. Under this state, the second extending portion 18C of the radially biasing portion 18 elastically biases the ear portion 11A or 11B of the friction pad 10 (backing plate 11) toward the radially outer side of the disc rotor 1, thereby suppressing backlash of the friction pad 10 in the disc radial direction with respect to the mounting member 2.

As illustrated in FIG. 5 to FIG. 8, protruding portions 19 protruding in the direction of approaching the disc rotor 1 are integrally formed in the locking plate portion 16 (that is, the locking portion) of the pad spring 13. Two protruding portions 19 are formed at positions that are in the locking plate portion 16 of the pad spring 13, and are on an extension plane in the outer peripheral direction of the disc rotor 1. In other words, for example, the two protruding portions 19 are formed at positions that are of the locking plate portion 16 of the pad spring 13, and are opposed to the disc rotor 1 on the radially outer side of the disc rotor 1. The number of the protruding portions 19 may be one or three or more.

Figure 8:
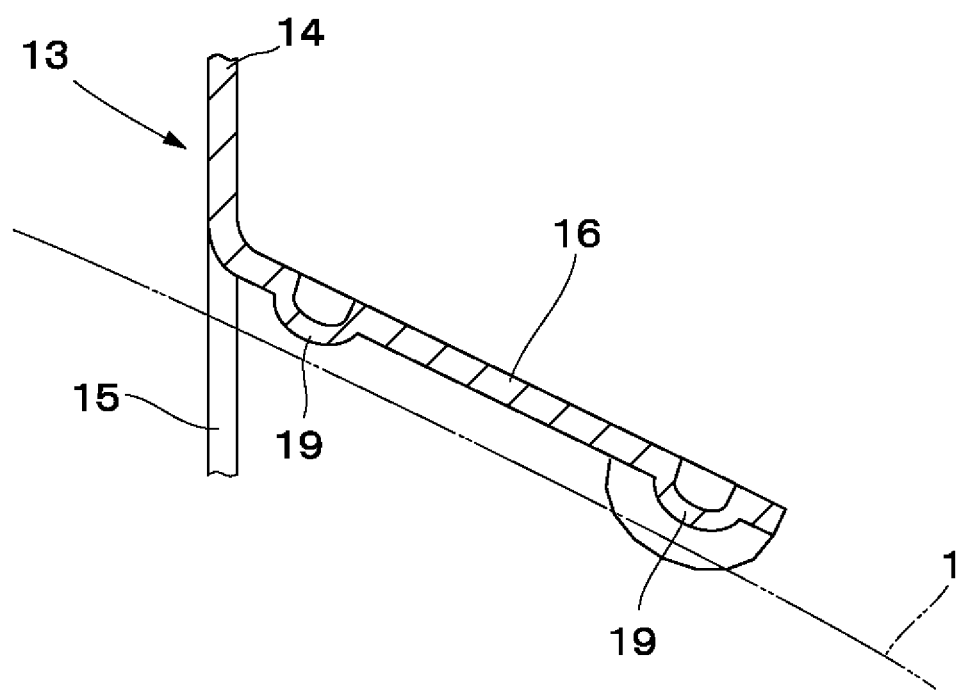
FIG. 8 is a cross-sectional view of a main part of protruding portions formed in the locking plate portion as viewed from an arrow VIII-VIII direction of FIG. 7.
Figure 10:
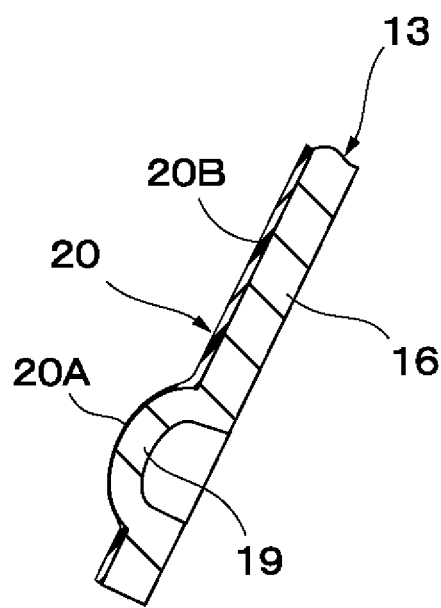
FIG. 10 is a partial cross-sectional view for illustrating the resin coating having different film thicknesses formed in the locking plate portion of the pad spring.

For example, as illustrated in FIG. 8, the protruding portion 19 is formed as a protrusion having a cross section in an arc shape, a square-cornered U shape, or a U shape. A bottom surface of the protrusion protrudes in a direction of approaching the rotational locus (indicated by two-dot chain line of FIG. 8) of the disc rotor 1. Moreover, as illustrated in FIG. 10, a resin coating 20 made of, for example, an insulating coating material is applied to a bottom surface (front surface of the protrusion) of the protruding portion 19. A film thickness of a coating film 20A thereof is thinner than a film thickness of a coating film 20B in other region. In other words, in the locking plate portion 16, the coating film 20A in at least a part (that is, the protruding portions 19) of the region opposed to the disc rotor 1 has the thinner coating film thickness than that in other region.

Figure 9:
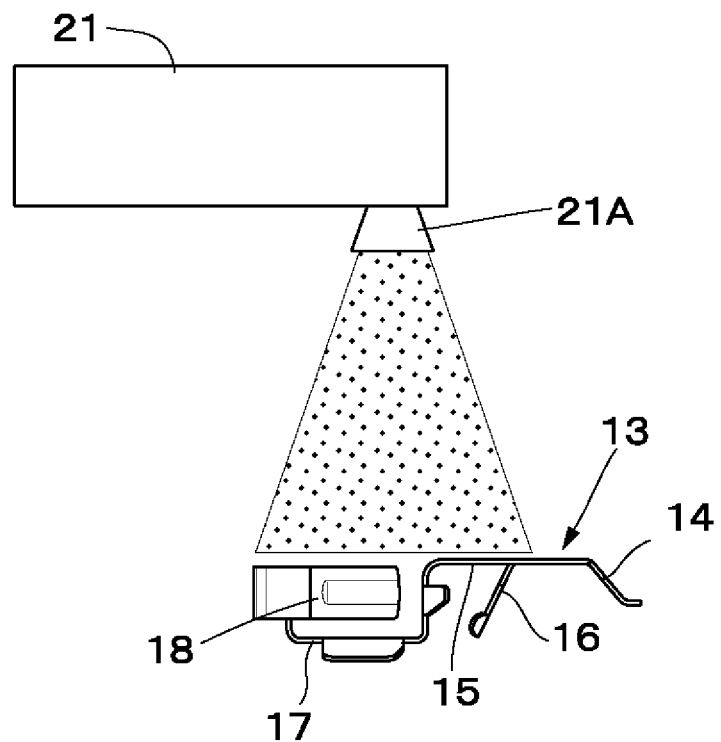
FIG. 9 is an explanatory view for illustrating a state of work of applying a resin coating to the pad spring.

A coating apparatus 21 illustrated in FIG. 9 is configured to spray, for example, an insulating coating material from a nozzle 21A toward the pad spring 13. As a result, the resin coating 20 made of the insulating coating material is applied to a front surface side of the guide plate portion 17 and the like of the pad spring 13. The resin coating 20 is simultaneously applied not only to portions (guide plate portions 17) of the pad spring 13 to be in contact with the friction pad 10, but also to the surfaces (regions opposed to the outer peripheral surface being the rotor surface of the disc rotor 1) of the locking plate portion 16.

That is, the spray of the coating material by the coating apparatus 21 is required to form a uniform coating film over a wide spray range in order to increase workability, and the coating film (for example, the resin coating 20) is formed not only in the guide plate portions 17 of the pad spring 13, but also in the locking plate portion 16. In this case, when the surfaces of the locking plate portion 16 and the like are covered with a mask or the like, the attachment of the coating film can be prevented. However, in this case, additional time is spent for attachment and detachment of the mask, resulting in a decrease in workability. To deal with this problem, for example, as illustrated in FIG. 9, the spray work of the coating material by the coating apparatus 21 is simultaneously applied not only to the guide plate portions 17 of the pad spring 13, but also to the locking plate portion 16.

As a result, as illustrated in FIG. 10, the resin coating 20 is formed on the front surface side (surface in the region opposed to the outer peripheral surface of the disc rotor 1) of the locking plate portion 16 of the pad spring 13. However, the coating film formed on the front surface of the locking plate portion 16 flows downward by its own weight before the coating material is solidified. As a result, the coating film 20A formed on the bottom surfaces of the protruding portions 19 (front surface of the protrusion) is thinner than the coating film 20B in other region. In particular, when the coating material is to be dried, the film thickness of the coating film 20A on the protruding portions 19 can be thinner than that of the coating film 20B in other region by arranging the pad spring 13 such that the bottom surfaces of the protruding portions 19 (front surfaces of the protrusions) are at positions on the upper side and other region is at a position on the lower side.

As a result, the coating film 20A formed on the bottom surfaces of the protruding portions 19 (front surfaces of the protrusions) has a smaller insulation resistance value than that of the coating film 20B in other region, and the electric conductivity can thus be increased relatively. Consequently, when a clearance inspection described below is conducted, the electrical short circuit property can be secured between the bottom surface of the protruding portion 19 and a jig portion (not shown) corresponding to the disc rotor, thereby being capable of increasing accuracy of the clearance inspection.

Also when the resin coating 20 is not applied to the bottom surfaces of the protruding portions 19 (front surfaces of the protrusions), it is preferred that the protruding portions 19 protruding in the direction of approaching the disc rotor 1 be formed in the locking plate portion 16 (locking portion) of the pad spring 13. The protruding portion 19 in this case can be a portion that is close to the rotor surface (outer peripheral surface) of the disc rotor 1 with the smallest clearance on the radially outer side, and the accuracy of the clearance inspection can be increased by conducting the clearance inspection through the electrical short circuit in this closest portion.

The disc brake and the pad spring 13 according to the first embodiment have the above-mentioned configuration. A description is now given of the operation thereof.

Upon the brake operation of the vehicle, a brake hydraulic pressure is supplied to the inner leg portion 6A (cylinder) of the caliper 6 to slidingly displace the piston toward the disc rotor 1, to thereby press the friction pad 10 on the inner side against the one side surface of the disc rotor 1. Under this state, the caliper 6 receives a reaction force of the pressing from the disc rotor 1, the entire caliper 6 slidingly displaces toward the inner side with respect to the arm portions 2A of the mounting member 2, and the outer leg portion 6C presses the friction pad 10 on the outer side against another side surface of the disc rotor 1.

As a result, the friction pads 10 on the inner side and the outer side can firmly hold the disc rotor 1 rotating in, for example, the arrow A direction of FIG. 1 and FIG. 2 (when the vehicle travels forward) from both sides of the axial direction between the friction pads 10, and the braking force can thus be applied to the disc rotor 1. After that, when the brake operation is canceled, the supply of the hydraulic pressure to the piston is stopped, thereby separating the friction pads 10 on the inner side and the outer side from the disc rotor 1, resulting in returning again to a non-braking state.

Incidentally, it is known that the resin coating 20 is applied to the pad spring 13 at portions that are in contact with the friction pads 10 (the ear portion 11A or 11B of the backing plates 11) so that the friction pads 10 can smoothly displace slidingly with respect to each arm portion 2A (pad guide 4) of the mounting member 2. That is, the spray of the coating material (resin coating 20) by the coating apparatus 21 illustrated in FIG. 9 is applied simultaneously not only the guide plate portions 17 of the pad spring 13, but also to the locking plate portion 16 in order to increase the workability.

Moreover, in order to avoid a defect caused by interference with components on the vehicle side when the disc brake (for example, the mounting member 2 and the caliper 6) is assembled to the vehicle, the clearance inspection is conducted at the time of shipment of the brake so as to check whether or not, for example, the caliper 6 and the like are accommodated in a specified space. As the clearance inspection, under a state in which the mounting member 2, the pad spring 13, and the like are mounted on the jig that models shapes of components such as the disc rotor 1 around the caliper (that is, jig portion corresponding to the disc rotor), whether or not, for example, the pad spring 13 and the jig portion corresponding to the disc rotor are in contact with each other is checked through whether or not an electric short circuit is occurring therebetween.

When such a clearance inspection is conducted, there is brought about a state in which the locking plate portion 16 of the pad spring 13 is close to the jig portion corresponding to the disc rotor (for example, the rotational locus of the disc rotor 1 illustrated in FIG. 3 and FIG. 4), and the presence or absence of the contact therebetween is electrically detected.

However, the resin coating 20 is applied to the locking plate portion 16 of the pad spring 13, even when the jig portion corresponding to the disc rotor and the locking plate portion 16 are in contact with each other due to, for example, a defect, an electrical short circuit may not occur due to the insulation property of the resin coating 20. That is, even when a desired clearance is not secured therebetween, the pad spring 13 passes the clearance inspection, and an erroneous determination may consequently be made.

Meanwhile, according to the first embodiment, the protruding portions 19 protruding in the direction of approaching the disc rotor 1 are integrally formed in the locking plate portion 16 of the pad spring 13. Moreover, the resin coating 20 is formed on the front surface side (surface in the region opposed to the outer peripheral surface of the disc rotor 1) of the locking plate portion 16. Further, the coating film formed on the front surface of the locking plate portion 16 flows downward by its own weight before the coating material is solidified. As a result, the coating film 20A formed on the bottom surfaces (front surfaces of the protrusions) of the protruding portions 19 is thinner in film thickness than that in the coating film 20B in other region.

As a result, the coating film 20A formed on the bottom surfaces of the protruding portions 19 (front surfaces of the protrusions) has the smaller insulation resistance value than that of the coating film 20B in other region, and the electric conductivity can relatively be increased. Consequently, when the above-mentioned clearance inspection is conducted, the electrical short circuit property can be secured between the bottom surfaces of the protruding portions 19 and the jig portion corresponding to the disc rotor, thereby being capable of increasing the accuracy of the clearance inspection.

Thus, according to the first embodiment, of the resin coating 20 formed in the locking plate portion 16 of the pad spring 13, the coating film 20A on the protruding portions 19 is thinner than the coating film 20B on other portion (region). As a result, the protruding portions 19 of the locking plate portion 16 have the thinner coating film 20A so as to secure the property of the electrical short circuit with respect to the jig portion corresponding to the disc rotor in the clearance inspection, and the presence or absence of the contact of the locking plate portion 16 with the jig portion corresponding to the disc rotor (for example, the rotational locus of the disc rotor 1 of FIG. 3 and FIG. 4) can electrically be detected without an error, and the accuracy of the clearance inspection can be increased.

Moreover, even the pad spring 13 without the resin coating 20 formed in the locking plate portion 16 can provide the following effect. That is, the protruding portions 19 protruding in the direction of approaching the disc rotor 1 are formed in the locking plate portion 16 of the pad spring 13, to thereby be capable of forming the protruding portions 19 as the portions having the narrowest clearance on the radially outer side of the disc rotor 1. The clearance inspection can thus be conducted at the closest portions through the electrical short circuit, and the accuracy of the inspection can consequently be increased.

Figure 11:
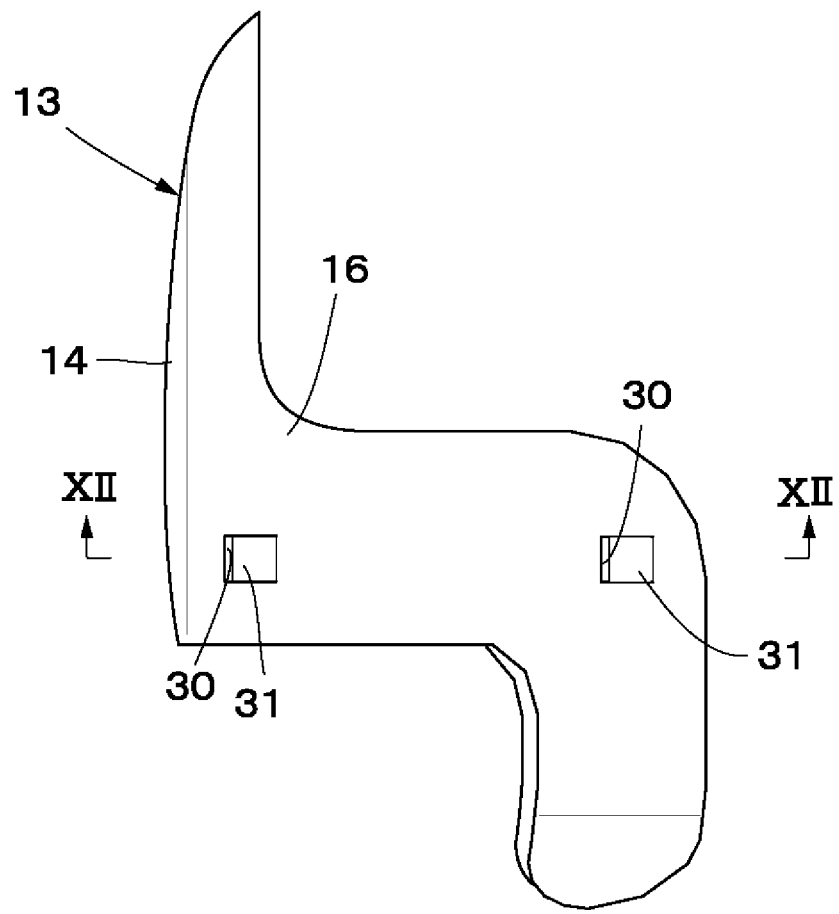
FIG. 11 is an enlarged view of a main part for illustrating a part of a locking plate portion employed in a second embodiment of the present invention.
Figure 12:
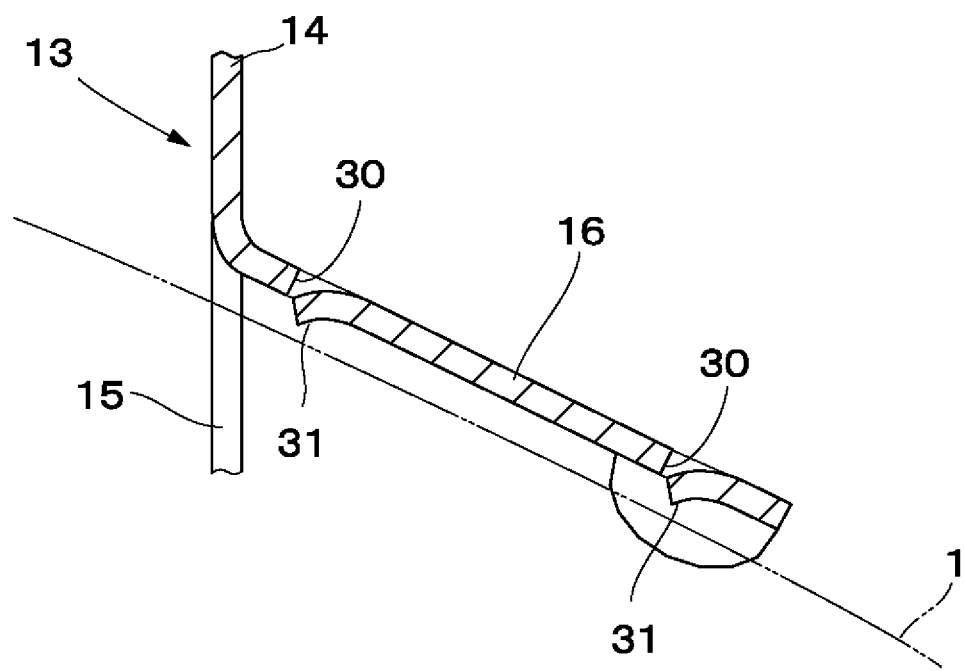
FIG. 12 is a cross-sectional view of a main part of protruding portions formed in the locking plate portion as viewed from an arrow XII-XII direction of FIG. 11.
Figure 13:
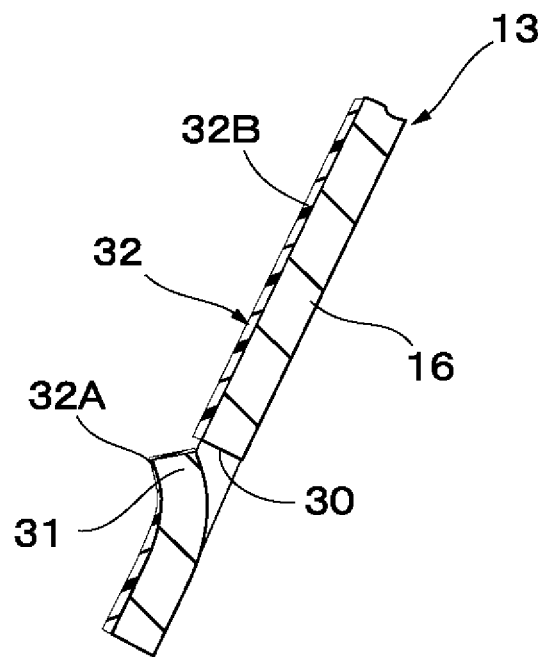
FIG. 13 is a partial cross-sectional view for illustrating a resin coating having different film thicknesses formed in the locking plate portion of the pad spring.

FIG. 11 to FIG. 13 show a second embodiment. In this embodiment, the same components as those in the first embodiment described above are denoted by the same reference symbols, and description thereof is omitted. However, a feature of the second embodiment is that cutouts 30 each in a square-cornered U shape are formed in the locking plate portion 16 of the pad spring 13, and an end portion (free end) of each cutout 30 is bent in the direction of approaching the disc rotor 1, to thereby form a protruding portion 31 protruding from a lower surface of the locking plate portion 16 (downward of FIG. 4).

Similarly to the protruding portions 19 described in the first embodiment, two protruding portions 31 are formed at positions that are in the locking plate portion 16 of the pad spring 13, and are on an extension plane in the outer peripheral direction of the disc rotor 1. In other words, for example, the two protruding portions 31 are formed at positions that are of the locking plate portion 16 of the pad spring 13, and are opposed to the disc rotor 1 on the radially outer side of the disc rotor 1. The number of the protruding portions 31 may be one or three or more.

Moreover, as illustrated in FIG. 13, a resin coating 32 made of, for example, an insulating coating material is applied to the locking plate portion 16 of the pad spring 13. However, a coating film 32A formed at the distal end (free end) of the protruding portion 31 flows downward by its own weight before the coating material is solidified, and thus has a thinner film thickness than that of a coating film 32B in other region. In other words, in the locking plate portion 16, the coating film 32A in at least a part (that is, the protruding portions 31) of the region opposed to the disc rotor 1 has the thinner coating film thickness than that in other region.

Thus, also in the second embodiment configured as described above, the protruding portions 31 protruding in the direction of approaching the disc rotor 1 are formed in the locking plate portion 16 of the pad spring 13, and the coating film 32A thinner in the coating film thickness than that in other region is formed at the distal ends (free ends) of the protruding portions 31, thereby being capable of providing the same effects as those in the first embodiment.

In particular, in the second embodiment, the cutouts 30 each in the square-cornered U shape are formed in the locking plate portion 16 of the pad spring 13, and the end portion (free end) of each cutout 30 is bent in the direction of approaching the disc rotor 1, to thereby form the protruding portions 31 protruding from the lower surface of the locking plate portion 16 (downward of FIG. 4). As a result, a protruding amount of the protruding portion 31 opposed to the rotor surface (outer peripheral surface) of the disc rotor 1 can be adjusted by a degree of the bend of the cutout 30, thereby being capable of easily securing the clearance between the protruding portion 31 of the locking plate portion 16 and the disc rotor 1.

Moreover, even in the second embodiment described above, the pad spring 13 without the resin coating 32 formed in the locking plate portion 16 can provide the following effect. That is, the protruding portions 31 protruding in the direction of approaching the disc rotor 1 are formed in the locking plate portion 16 of the pad spring 13, to thereby be capable of forming the protruding portions 31 as the portions having the narrowest clearance on the radially outer side of the disc rotor 1. The clearance inspection can thus be conducted at the closest portions through the electrical short circuit, and the accuracy of the inspection can consequently be increased.

Figure 14:
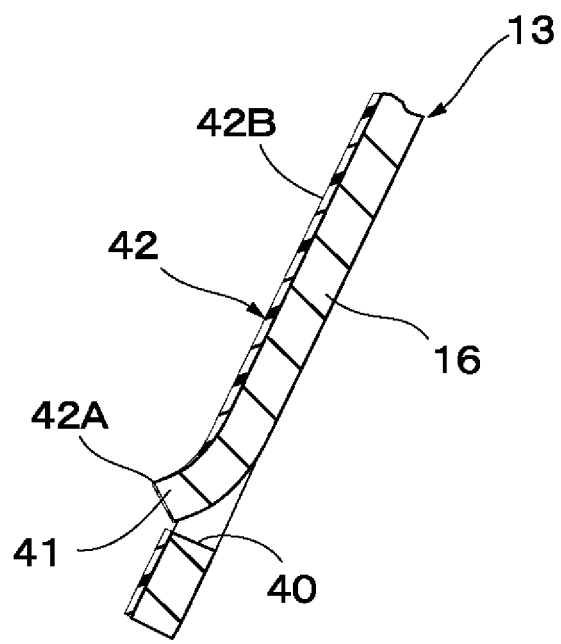
FIG. 14 is a partial cross-sectional view for illustrating a resin coating having different film thicknesses formed in the locking plate portion of the pad spring according to a third embodiment of the present invention.

FIG. 14 shows a third embodiment. In this embodiment, the same components as those in the second embodiment described above are denoted by the same reference symbols, and description thereof is omitted. However, a feature of the third embodiment is that protruding portions 41 are formed by bending in the opposite direction to that of the protruding portions 31 in the second embodiment.

That is, in the third embodiment, cutouts 40 each in the square-cornered U shape are formed (in the opposite direction to that of the cutouts 30 in the second embodiment) in the locking plate portion 16 of the pad spring 13, and the end portion (free end) of each cutout 40 is bent in the direction of approaching the disc rotor 1, to thereby form the protruding portions 41 protruding from the lower surface of the locking plate portion 16 toward the disc rotor 1 side.

Moreover, as illustrated in FIG. 14, a resin coating 42 made of, for example, an insulating coating material is applied to the locking plate portion 16 of the pad spring 13. However, a coating film 42A formed at the distal end (free end) of the protruding portion 41 flows downward by its own weight before the coating material is solidified, and thus has a thinner film thickness than that of a coating film 42B in other region. In other words, in the locking plate portion 16, the coating film 42A in at least a part (that is, the protruding portions 41) of the region opposed to the disc rotor 1 has the thinner coating film thickness than that in other region.

Thus, also in the third embodiment configured as described above, the protruding portions 41 protruding in the direction of approaching the disc rotor 1 are formed in the locking plate portion 16 of the pad spring 13, and the coating film 42A thinner in the coating film thickness than that in other region is formed at the distal ends (free ends) of the protruding portions 41, thereby being capable of providing the same effects as those in the second embodiment.

Moreover, even in the third embodiment described above, the pad spring 13 without the resin coating 42 formed in the locking plate portion 16 can provide the following effect. That is, the protruding portions 41 protruding in the direction of approaching the disc rotor 1 are formed in the locking plate portion 16 of the pad spring 13, to thereby be capable of forming the protruding portions 41 as the portions having the narrowest clearance on the radially outer side of the disc rotor 1. The clearance inspection can thus be conducted at the closest portions through the electrical short circuit, and the accuracy of the inspection can consequently be increased.

Figure 15:
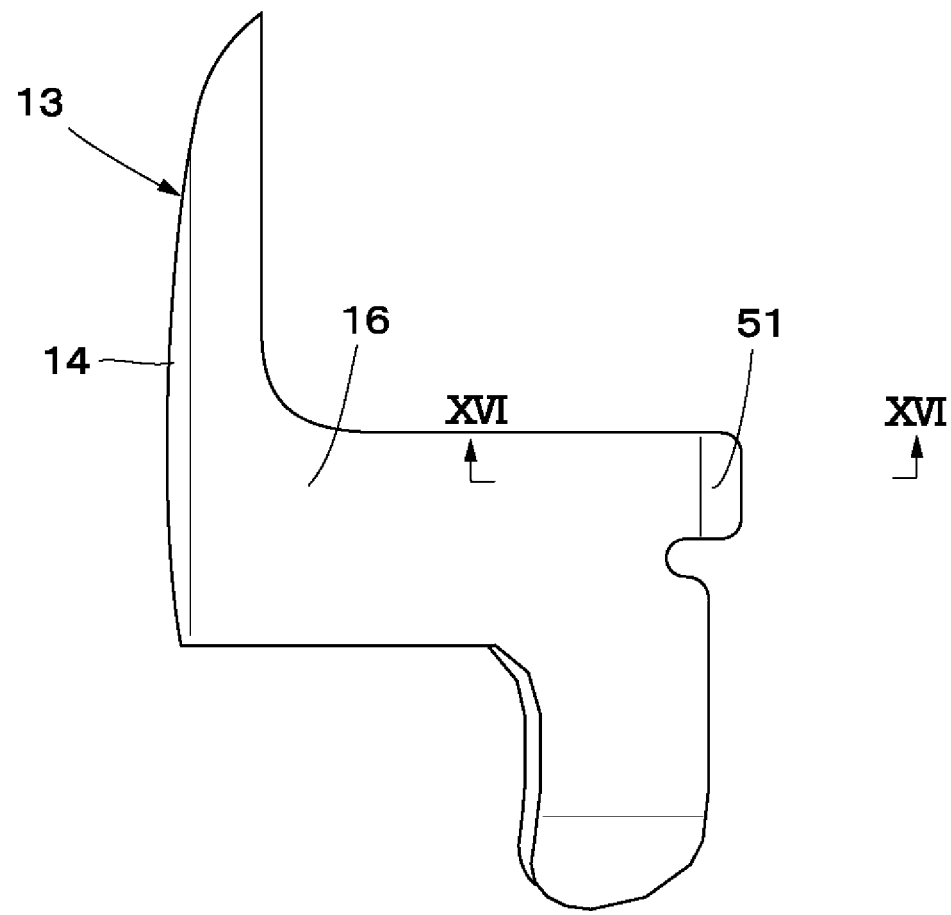
FIG. 15 is an enlarged view of a main part for illustrating a part of a locking plate portion employed in a fourth embodiment of the present invention.
Figure 16:
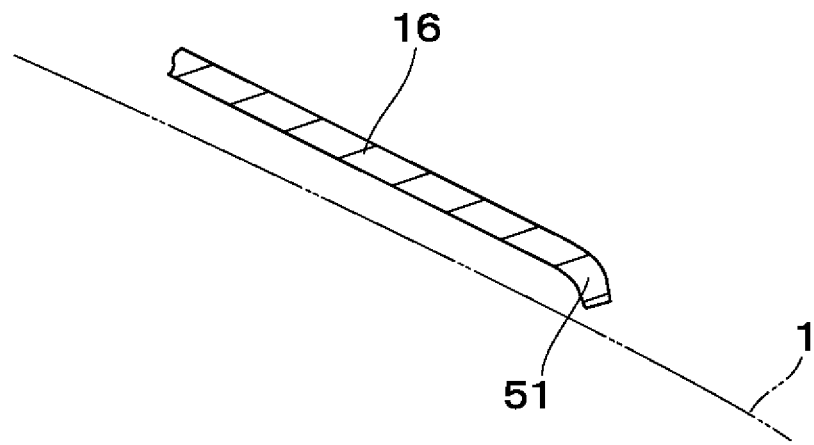
FIG. 16 is a cross-sectional view of a main part of a protruding portion formed in the locking plate portion as viewed from an arrow XVI-XVI direction of FIG. 15.
Figure 17:
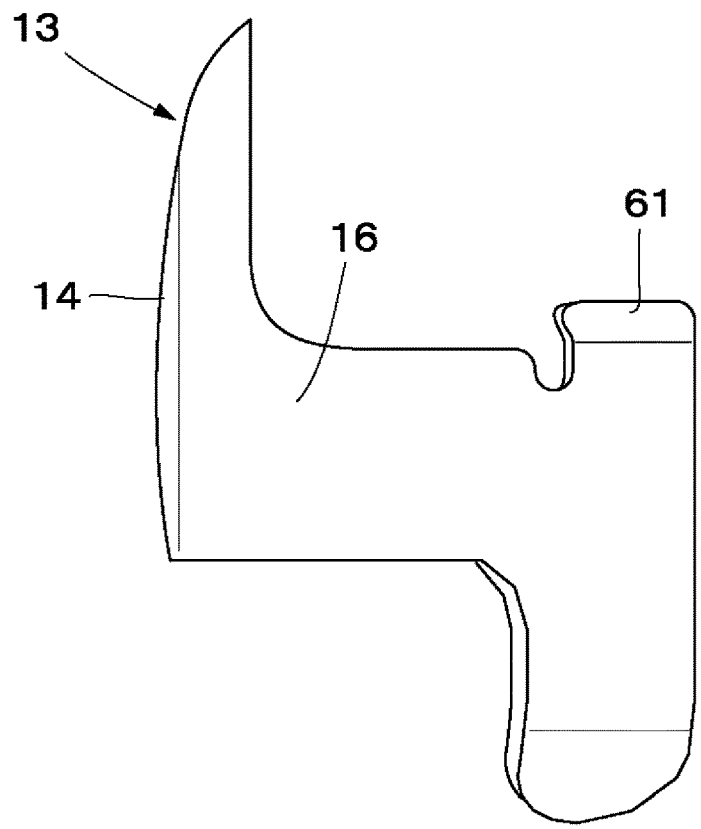
FIG. 17 is an enlarged view of a main part for illustrating a part of a locking plate portion in a first modification example.

FIG. 15 to FIG. 16 are drawings for illustrating a fourth embodiment. In this embodiment, the same components as those in the first embodiment described above are denoted by the same reference symbols, and description thereof is omitted. However, a feature of the fourth embodiment is a configuration of providing a protruding portion 51 formed of a protruding piece in a substantially square-cornered U shape in the locking plate portion 16 of the pad spring 13.

The protruding portion 51 is formed by additionally forming the protruding piece in the substantially square-cornered U shape on the distal end side of the locking plate portion 16 of the pad spring 13. The protruding portion 51 is formed as a protruding piece that extends in the circumferential direction (rotation direction) of the disc rotor 1. The protruding portion 51 is formed so as to protrude from the lower surface of the locking plate portion 16 (downward of FIG. 16) by bending the end portion (free end) side thereof in the direction of approaching the disc rotor 1. In other words, for example, the protruding portions 51 are formed at positions that are of the locking plate portion 16 of the pad spring 13, and are opposed to the disc rotor 1 on the radially outer side of the disc rotor 1.

Moreover, the resin coating (not shown) made of the insulating coating material described in the first embodiment is applied to the locking plate portion 16 of the pad spring 13. However, the coating film formed at the distal end (free end) of the protruding portion 51 flows downward by its own weight before the coating material is solidified, and has thus a thinner film thickness than that of a coating film in other region. In other words, in the locking plate portion 16, the coating film of at least a part (that is, the protruding portions 51) of the region opposed to the disc rotor 1 has the thinner coating film thickness than that in other region.

Thus, also in the fourth embodiment configured as described above, the protruding portion 51 protruding in the direction of approaching the disc rotor 1 is formed in the locking plate portion 16 of the pad spring 13, and the coating film thinner in the coating film thickness than that in other region is formed at the distal end (free end) of the protruding portion 51, thereby being capable of providing the same effects as those in the first embodiment.

In the fourth embodiment, description has been given of, as an example, the case in which the protruding portion 51 formed in the locking plate portion 16 of the pad spring 13 is formed as the protruding piece extending in the circumferential direction (rotation direction) of the disc rotor 1. However, the present invention is not limited to this example, and, for example, as in a first modification example of FIG. 17, a protruding portion 61 may be formed as a protruding piece that protrudes not in the circumferential direction (rotation direction) of the disc rotor, but in the axial direction of the disc rotor.

Figure 18:
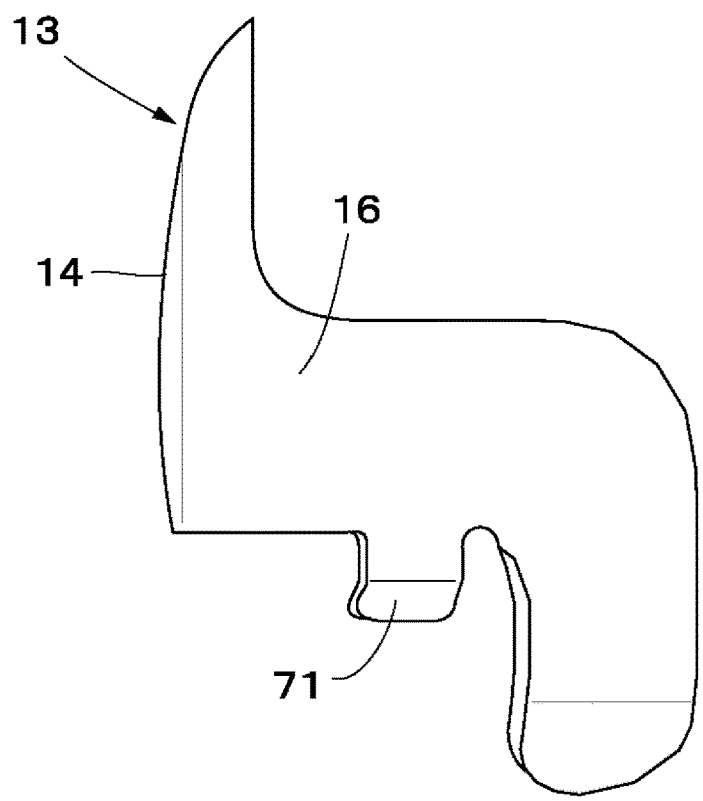
FIG. 18 is an enlarged view of a main part for illustrating a part of a locking plate portion in a second modification example.

Moreover, a protruding portion 71 may be formed as in a second modification example of FIG. 18. The protruding portions 61 and 71 in the modification examples also protrude from the lower surface of the locking plate portion 16 by bending the respective end portion (free end) sides thereof in the direction of approaching the disc rotor 1. Further, also in each of the protruding portions 61 and 71, the coating film of at least a part (that is, each of the protruding portions 61 and 71) of the region opposed to the disc rotor 1 has the thinner coating film thickness than that in other region.

Moreover, in the respective embodiments, description is given of, as an example, the pad spring 13 including the coupling plate portion 14, the flat plate portions 15, the locking plate portion 16, the guide plate portions 17, and the radially biasing portions 18. However, the pad spring employed in the present invention is not limited to this example, and as long as a disc brake includes the locking portion configured to lock the pad spring in a portion of the mounting member, for example, the portion straddling the outer peripheral side of the disc rotor, any one of the pad springs can be applied. The present invention can be applied also to a disc brake employing such a pad spring.

Description is now given of the inventions according to the embodiments. That is, as a first aspect of the present invention, there is provided a pad spring to be installed in a disc brake, the pad spring including a locking portion to be locked to a mounting member to be mounted to a non-rotational portion of a vehicle. The locking portion includes a coating film having a thinner coating film thickness in at least a part of a region opposed to a disc rotor than a coating film thickness in other region.

As a second aspect of the present invention, there is provided a pad spring to be installed in a disc brake, the pad spring including a locking portion to be locked to a mounting member to be mounted to a non-rotational portion of a vehicle. The locking portion includes a protruding portion protruding in a direction of approaching a disc rotor. Further, as a pad spring according to a third aspect of the present invention, in the second aspect, the protruding portion is formed at a position on an extension plane of the disc rotor in an outer peripheral direction.

According to a fourth aspect of the present invention, there is provided a disc brake, including: a mounting member, which is to be mounted to a non-rotational portion of a vehicle, and is formed so as to straddle an outer peripheral side of a disc rotor; a pair of friction pads configured to be pressed against both of surfaces of the disc rotor; and a pad spring, which is mounted to the mounting member, and is configured to elastically support the respective friction pads. The pad spring includes a locking portion configured to lock the pad spring to a portion of the mounting member that straddles the outer peripheral side of the disc rotor. The locking portion includes a coating film having a thinner coating film thickness in at least a part of a region opposed to the disc rotor than a coating film thickness in other region.

According to a fifth aspect of the present invention, there is provided a disc brake, including: a mounting member, which is to be mounted to a non-rotational portion of a vehicle, and is formed so as to straddle an outer peripheral side of a disc rotor; a pair of friction pads configured to be pressed against both of surfaces of the disc rotor; and a pad spring, which is mounted to the mounting member, and is configured to elastically support a corresponding one of the friction pads. The pad spring includes a locking portion configured to lock the pad spring to a portion of the mounting member that straddles the outer peripheral side of the disc rotor. The locking portion includes a protruding portion protruding in a direction of approaching a disc rotor. Further, as a disc brake according to a sixth aspect of the present invention, in the fifth aspect, the protruding portion is formed at a position on an extension plane of the disc rotor in an outer peripheral direction.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2018-236336 filed on Dec. 18, 2018. All disclosed contents including Specification, Scope of Claims, Drawings, and Abstract of Japanese Patent Application No. 2018-236336 filed on Dec. 18, 2018 are incorporated herein by reference in their entirety.

REFERENCE SIGNS LIST

1 disc rotor, 2 mounting member, 2A pair of arm portion, 3 disc path portion, 4 pad guide, 6 caliper, 10 friction pad, 13 pad spring, 14 coupling plate portion, 16 locking plate portion (locking portion), 17 guide plate portion, 18 radially biasing portion, 19,31,41,51,61,71 protruding portion, 20,32,42 resin coating, 20A,32A,42A coating film, 20B, 32B,42B coating film in other region

The invention claimed is:

1. A pad spring to be installed in a disc brake, the pad spring comprising a locking portion to be locked to a mounting member to be mounted to a non-rotational portion of a vehicle,
    wherein the locking portion includes a coating film having a thinner coating film thickness in at least a part of a region opposed to a disc rotor than a coating film thickness in other regions of the locking portion.

2. The pad spring according to claim 1,
wherein the locking portion includes a protruding portion opposed to a disc rotor, the protruding portion has a protrusion front surface to which the coating film is applied, and the coating film has a thinner coating film thickness than the coating film thickness in the other regions.

3. The pad spring according to claim 2,
wherein the coating film thickness of the protruding portion is thinner than the coating film thickness in the other regions by flowing downward by its own weight before the coating film is solidified.

4. A disc brake, comprising:
a mounting member, which is to be mounted to a non-rotational portion of a vehicle, and is formed so as to straddle an outer peripheral side of a disc rotor;
a pair of friction pads configured to be pressed against both surfaces of the disc rotor; and
a pad spring, which is mounted to the mounting member, and is configured to elastically support a corresponding one of the friction pads,
wherein the pad spring includes a locking portion configured to lock the pad spring to a portion of the mounting member that straddles the outer peripheral side of the disc rotor, and
wherein the locking portion includes a coating film having a thinner coating film thickness in at least a part of a region opposed to the disc rotor than a coating film thickness in other regions of the locking portion.

5. The disc brake according to claim 4, wherein
the locking portion includes a protruding portion, and the protruding portion is formed at a position on an extension plane of a rotor surface of the disc rotor in an outer peripheral direction.

6. The disc brake according to claim 5,
wherein the coating film is formed on the protruding portion, and
wherein the coating film thickness of the coating film on the protruding portion is thinner than the coating film thickness in the other regions.

7. The disc brake according to claim 4,
wherein the protruding portion has a protrusion front surface to which the coating film is applied, and the coating film has a thinner coating film thickness than the coating film thickness in the other regions.

8. The disc brake according to claim 7,
wherein the coating film thickness of the protruding portion is thinner than the coating film thickness in the other regions by flowing downward by its own weight before the coating film is solidified.

* * * * *